(12) United States Patent
Radinger et al.

(10) Patent No.: US 8,579,512 B2
(45) Date of Patent: Nov. 12, 2013

(54) DRIVE UNIT FOR MOTOR VEHICLES HAVING AN ELECTRICAL MOTOR

(75) Inventors: Norbert Radinger, Nuremberg (DE); Tomas Smetana, Herzogenaurach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/504,557

(22) PCT Filed: Sep. 10, 2010

(86) PCT No.: PCT/EP2010/063322
§ 371 (c)(1),
(2), (4) Date: Apr. 27, 2012

(87) PCT Pub. No.: WO2011/051045
PCT Pub. Date: May 5, 2011

(65) Prior Publication Data
US 2012/0213460 A1    Aug. 23, 2012

(30) Foreign Application Priority Data
Oct. 28, 2009    (DE) .......................... 10 2009 051 002

(51) Int. Cl.
*F16C 19/06*    (2006.01)

(52) U.S. Cl.
USPC ............................................... 384/473; 464/7

(58) Field of Classification Search
USPC .............. 464/7; 384/462, 468, 473–475, 480, 384/481, 484; 310/90; 180/339; 475/159
See application file for complete search history.

(56) References Cited

U.S. PATENT DOCUMENTS

| | | | |
|---|---|---|---|
| 3,770,074 A | 11/1973 | Sherman | |
| 4,660,997 A * | 4/1987 | Brandenstein et al. | ... 384/484 X |
| 2005/0254740 A1 | 11/2005 | Takei et al. | |

FOREIGN PATENT DOCUMENTS

| | | |
|---|---|---|
| DE | 198 41 159 A1 | 1/2000 |
| DE | 101 32 319 A1 | 1/2003 |
| FR | 2 780 213 A1 | 12/1999 |
| JP | 2004 215 393 A | 7/2004 |

* cited by examiner

*Primary Examiner* — Gregory Binda
(74) *Attorney, Agent, or Firm* — Lucas & Mercanti, LLP

(57) ABSTRACT

A drive unit for motor vehicles which has at least one electrical motor and at least one transmission assembly. The electrical motor and the transmission assembly are operatively connected to one another by at least one shaft and the shaft is rotatably mounted by at least one first rolling bearing which sits in a rotary union for the shaft in the transmission assembly.

16 Claims, 4 Drawing Sheets

DRIVE UNIT FOR MOTOR VEHICLES HAVING AN ELECTRICAL MOTOR

CROSS-REFERENCE TO RELATED APPLICATIONS

This application is a 371 of PCT/EP2010/063322 filed Sep. 10, 2010, which in turn claims the priority of DE 10 2009 051 002.8 filed Oct. 28, 2009. The priority of both applications is hereby claimed and both applications are incorporated by reference herein.

FIELD OF THE INVENTION

The invention relates to a drive unit for motor vehicles, which has at least one electric motor and at least one transmission assembly where the electric motor and the transmission assembly are operatively connected to one another by at least one shaft and the shaft is rotatably mounted by at least one first rolling bearing, which is located in a rotary lead-through for the shaft, in the transmission assembly.

BACKGROUND OF THE INVENTION

DE 198 41 159 A1 describes generic drive units for motor vehicles. One of the drive units has an electric motor and a transmission assembly which are operatively connected to one another by means of at least one shaft. The transmission assembly comprises a differential and is in operative connection with the electric motor by way of a planetary drive of the transmission assembly. The electric motor is arranged coaxially in relation to the differential. The differential is driven by the electric motor. For this reason, a transmission element is connected to the rotor shaft of the electric motor for rotation therewith.

The rotor shaft is rotatably mounted on a stator carrier by means of two rolling bearings in the form of ball bearings. The stator carrier is formed as one part with part of a housing of the drive unit. The rotor shaft is provided on the differential side with a gearing, which is the sun wheel of a planetary drive. The planet carrier for the planet wheels, which are in engagement with the sun of the planet wheel, is connected to the cage of the differential. The axle drive bevel gears of the differential are respectively connected to an output shaft for rotation therewith. One of the output shafts is arranged concentrically in relation to the input shaft, i.e. in relation to the rotor shaft and in relation to the rotor of the electric motor. For this purpose, the output shaft is fitted in the rotor shaft, which is formed as a hollow shaft, and is slidingly mounted in it. The transmission assembly is separated from the electric motor by a housing cover. The housing cover has the rotary lead-through for the rotor shaft, and consequently also for the output shaft fitted therein.

The interior of the electric motor is sealed off at the rotary lead-through with respect to the transmission assembly by means of a rotary shaft seal. Rotary shaft sealing rings have at least one sealing lip, which is in physical contact with a sealing surface and accordingly seals in a sliding manner during rotation. Both rolling bearings for mounting the rotor shaft are located inside the electric motor, which is not exposed to lubricating oil. This "dry" area is separated from a "wet" transmission-side area of the drive unit by means of a rotary shaft seal. The "wet" area has lubricating oil, which is distributed as spray oil or oil mist. Since the rolling bearings are arranged in the dry area, they are lubricated with grease and sealed off. The rolling bearings are ball bearings.

The lifetime of a rolling bearing is dependent on the service life of the lubricating grease with which this rolling bearing is lubricated. The service life of the grease is dependent on various factors, such as the type of lubricating grease, the rotational speed and the temperature. High temperatures in the electric motor may have disadvantageous effects on the service life of the grease, and consequently on the lifetime of the bearing.

DE 198 41 159 A1 shows with FIG. 2 a further drive unit of the generic type in which, as a departure from the arrangement described above, the rotor shaft is mounted by means of ball bearings on the housing of the drive unit, and consequently not inside the electric motor. One of the ball bearings is located on the transmission side in a housing cover which separates the electric motor from the transmission assembly. The other of the ball bearings is located on the output side in the electric motor on a portion of the housing. The housing cover has the rotary lead-through for the rotor shaft. The "dry" interior of the electric motor is sealed off at the rotary lead-through with respect to the "wet" area of the transmission assembly by means of a rotary shaft seal. The transmission-side ball bearing is located in the "wet" area and is lubricated with lubricating oil. The lubricating oil is directed to the ball bearing by way of an annular gap between the rotor shaft and the housing cover. In the rotary lead-through, the rotary shaft seal follows behind the ball bearing on the electric motor side. The lifetime of this ball bearing is strongly dependent on the amount of lubricating oil that constantly reaches the interior of the ball bearing.

The arrangement according to DE 198 41 159 A1 in FIG. 2 also shows a rotor shaft, which is a hollow shaft and in which an output shaft is fitted. An annular gap between the output shaft and the rotor shaft is sealed off on the transmission side toward the annular gap by means of a rotary shaft sealing ring, which prevents oil from escaping from the transmission by way of the annular gap.

SUMMARY OF THE INVENTION

The object of the invention is to provide a drive assembly in which it is ensured that rolling bearings are adequately supplied and have an adequate lifetime. It is also intended to provide a drive assembly with a low-cost sealing assembly and lubrication.

The invention can be used for all drive units for motor vehicles having at least one electric motor and having at least one transmission assembly in which the electric motor and the transmission assembly are operatively connected to one another by means of a rotor shaft of the electric motor. The rotor shaft, which receives the rotor of the electric motor, is mounted so as to rotate about the axis of rotation of the rotor shaft by means of at least one rolling bearing.

Rolling bearings are all bearings such as ball, needle or roller bearings of any configurations, such as angular-contact or radial bearings. The rolling bearings have inner raceways and outer raceways and rolling bodies arranged radially or axially between the raceways. The raceways are formed on bearing rings or directly on the shaft and/or the housing.

The shaft is, for example, an input shaft or output shaft of the transmission assembly for transmitting torques. The shaft is preferably the rotor shaft of the electric motor. It is conceivable that a shaft stub is also rotatably mounted with the first rolling bearing in the rotary lead-through. The shaft stub is, for example, the shank of a sun wheel, or alternatively of a planet carrier.

The rolling bearing is located in a rotary lead-through in a portion of the wall of the electric motor, the transmission or a cover that closes the interior of the electric motor from the interior of the transmission assembly or closes the interior of the transmission assembly from the interior of the electric motor.

The rotary lead-through is, for example, a cylindrical hole in the portion of the wall or in a bearing cover, a bearing plate or similar elements.

The rolling bearing is provided with seals. The seals are located on both sides of the rolling bodies and entirely or partially bridge the distance between the raceways or bearing rings. The rolling bearing is sealed off toward the electric motor by a first seal, which is in slidingly sealing contact with a sealing surface at at least one point, preferably with one or more sealing lips. The rolling bearing is open on the transmission side toward the transmission assembly by way of at least one radial first annular gap. The sealing gap is preferably formed as a sealing gap between a contactless seal and a sealing surface.

With such a configuration of the bearing assembly, the rolling bearing is sealed off with respect to the preferably "dry" area of the drive assembly. The rolling bearing is open with respect to the "wet" area by way of the annular gap, to the extent to which the dimensions of the sealing gap allow.

A refinement of the invention provides that the shaft is mounted by means of a second rolling bearing, which is arranged at a distance from the first rolling bearing and is sealed off on one side toward the electric motor by a second seal, which is in slidingly sealing contact with a sealing surface at at least one point. Like the first rolling bearing, the second rolling bearing is also open on the side directed away from the electric motor by way of at least one radial second annular gap.

A refinement of the invention provides that the rolling bearing is at least partially filled with lubricating grease. With a further refinement of the invention, it is provided that the radial annular gap allows lubricating oil to pass through. Furthermore, it is alternatively provided that the rolling bearing is at least partially filled with lubricating grease and that the radial annular gap allows lubricating oil to pass through. The seals of the sealing assembly according to the invention retain the solid constituents of the lubricating grease inside the bearing. The sealing gap of the gap seal is accordingly designed such that lubricating oil reaches the lubricating grease, but the lubricating grease is not washed out of the bearing.

The advantage of a drive unit according to the invention is that the dry and clean interior of the electric motor is sealed off, and consequently kept dry and clean. Since the sliding sealing is also integrated in the rolling bearing, there is no need for separate sealing seats in the rotary lead-through and sealing surfaces on the shaft. The arrangement can thus be configured in a more space-saving manner. The costs for producing the sealing seats and sealing surfaces are reduced. There is no need for time and cost to be expended for the mounting of a sealing ring in the drive unit. Since the interior of the rolling bearing is open on the transmission side, the frictional resistance is lower than it is when using a rolling bearing of the generic prior art that seals in a sliding manner on both sides. Furthermore, the interior of the rolling bearing according to the invention is accessible to lubricating oil by way of the gap seal and can be cooled and well lubricated by this oil.

In the rolling bearings of the prior art that are filled with lubricating grease, the lubricating oil of the grease often becomes separated from the solid constituents (e.g. soaps). This has the effect that the lubricating grease ultimately dries out and loses its lubricating effect. According to a refinement of the invention, the rolling bearing is filled with lubricating grease and has toward the "wet" side an annular gap that allows lubricating oil from the transmission assembly to pass through or is accessible to lubricating oil from one or more lubricating channels. With such a design of the lubricating gap, the lubricating grease is always supplied with lubricating oil and cannot dry out.

The arrangement is suitable in particular in drive units comprising an electric motor and a differential or for other hybrid drive assemblies. The electric motor is either the main drive or an auxiliary drive or a drive for a control unit. The rotor shaft of the electric motor and a rotationally symmetrical transmission element of the differential are preferably arranged concentrically in relation to a common axis of rotation. The transmission element is, for example, the sun wheel or the web of the differential. The transmission element and the rotor shaft are connected to one another for rotation with one another, the rotor shaft or the transmission element optionally being mounted with the first rolling bearing.

BRIEF DESCRIPTION OF THE DRAWINGS

The invention is explained in more detail below on the basis of exemplary embodiments. In the drawing.

DETAILED DESCRIPTION OF THE INVENTION

Figure 1:
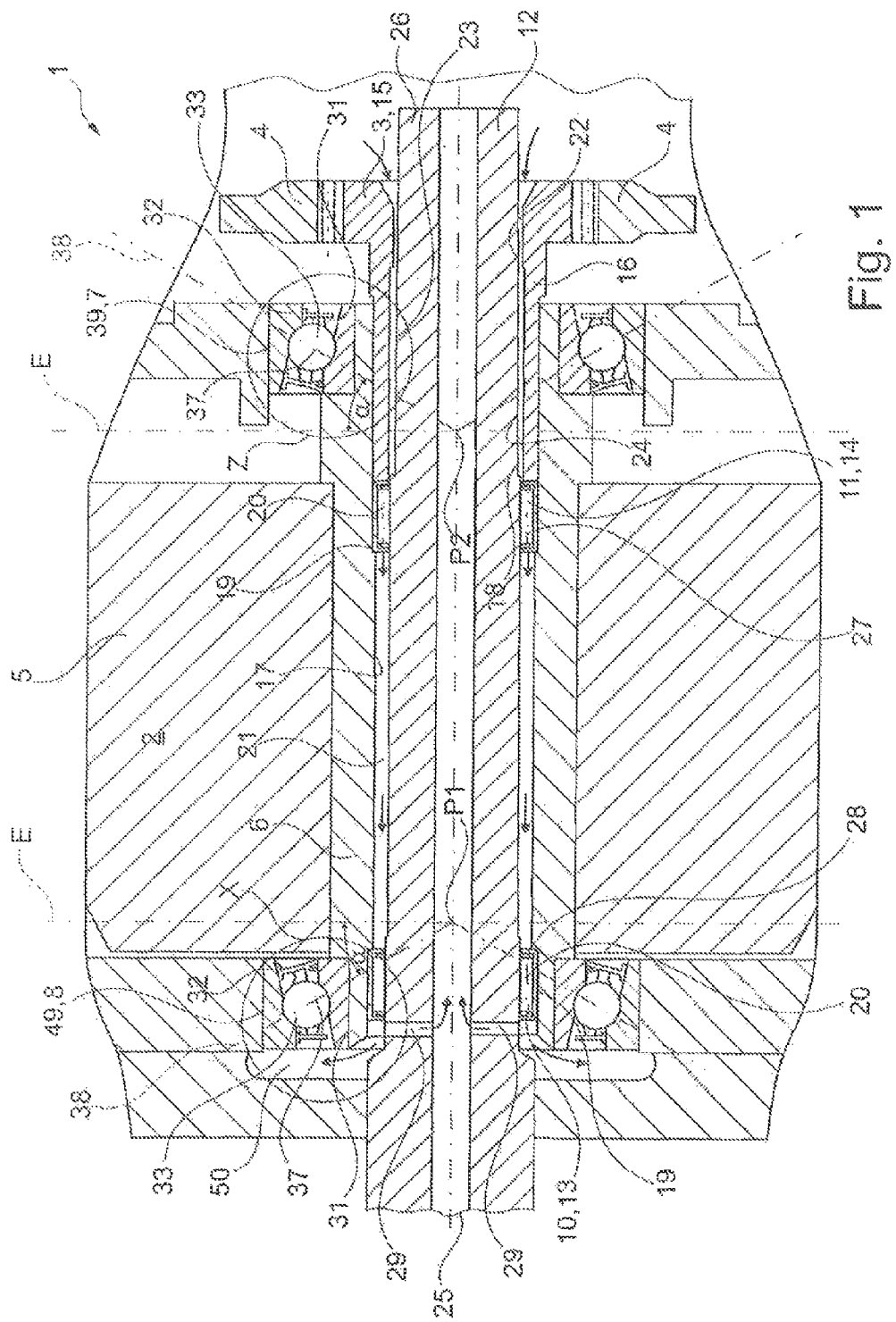
FIG. 1 shows a partial section along an axis of rotation of a drive unit, represented in a simplified form, having a transmission assembly in the form of a planetary gear of a differential and having an electric motor.

FIG. 1—FIG. 1 shows a partial section of a drive unit 1, represented in a simplified form, having a transmission assembly in the form of a planetary gear of a differential and having an electric motor 2. The planetary gear is graphically depicted partly with a sun wheel 3 and with planet wheels 4. The electric motor 2 and the transmission assembly are operatively connected to one another by means of a rotor shaft 6 of the electric motor 2. The rotor shaft 6 receives the rotor 5 of the electric motor and is rotatably mounted twice by means of rolling bearings 39 and 49 in the configuration of angular-contact ball bearings 7 and 8 in the housing 9 of the drive unit 1.

Figure 2:
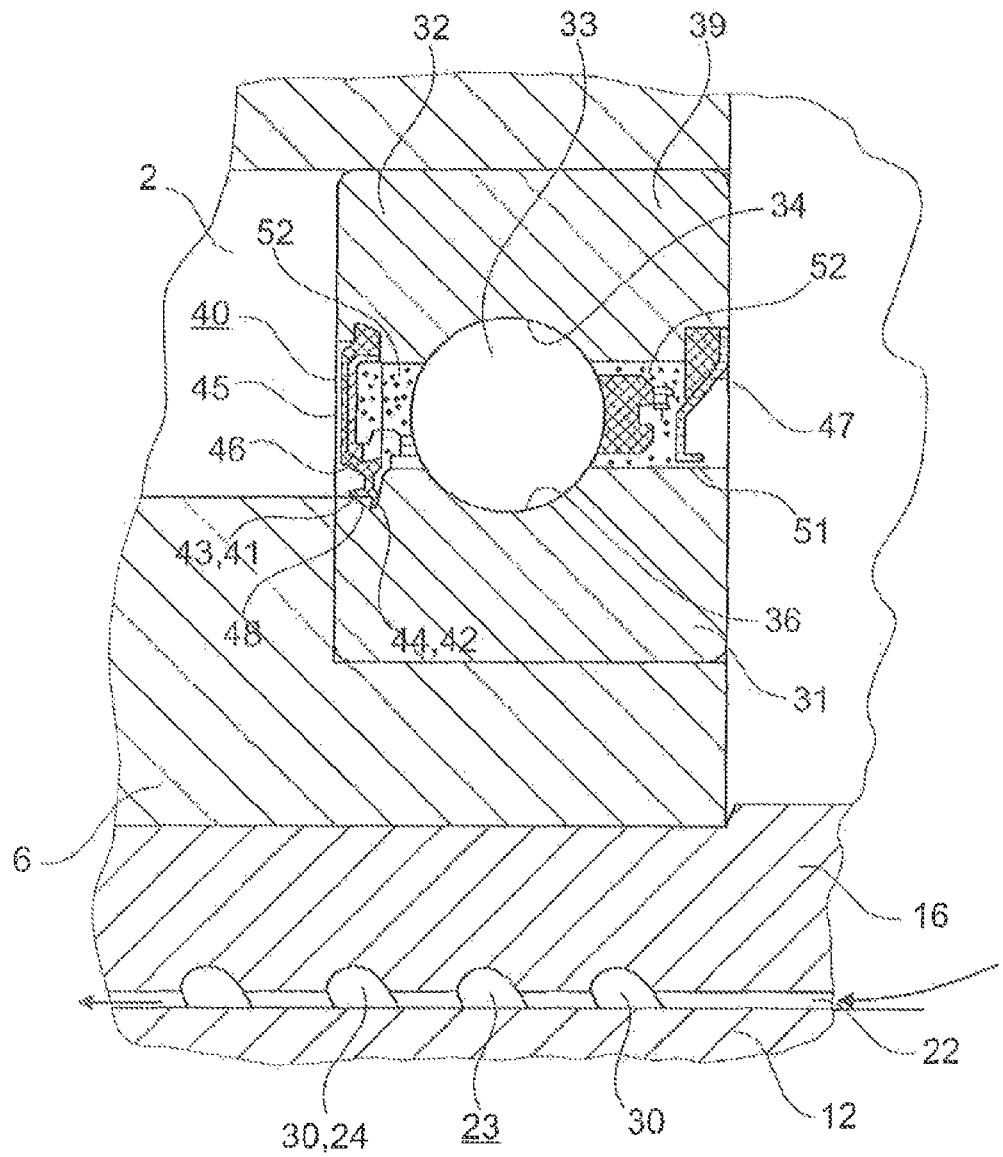
FIG. 2 shows the detail Z from FIG. 1, with which the transmission-side rolling bearing for mounting the rotor shaft of the electric motor is represented in an enlarged form and not to scale.
Figure 3:
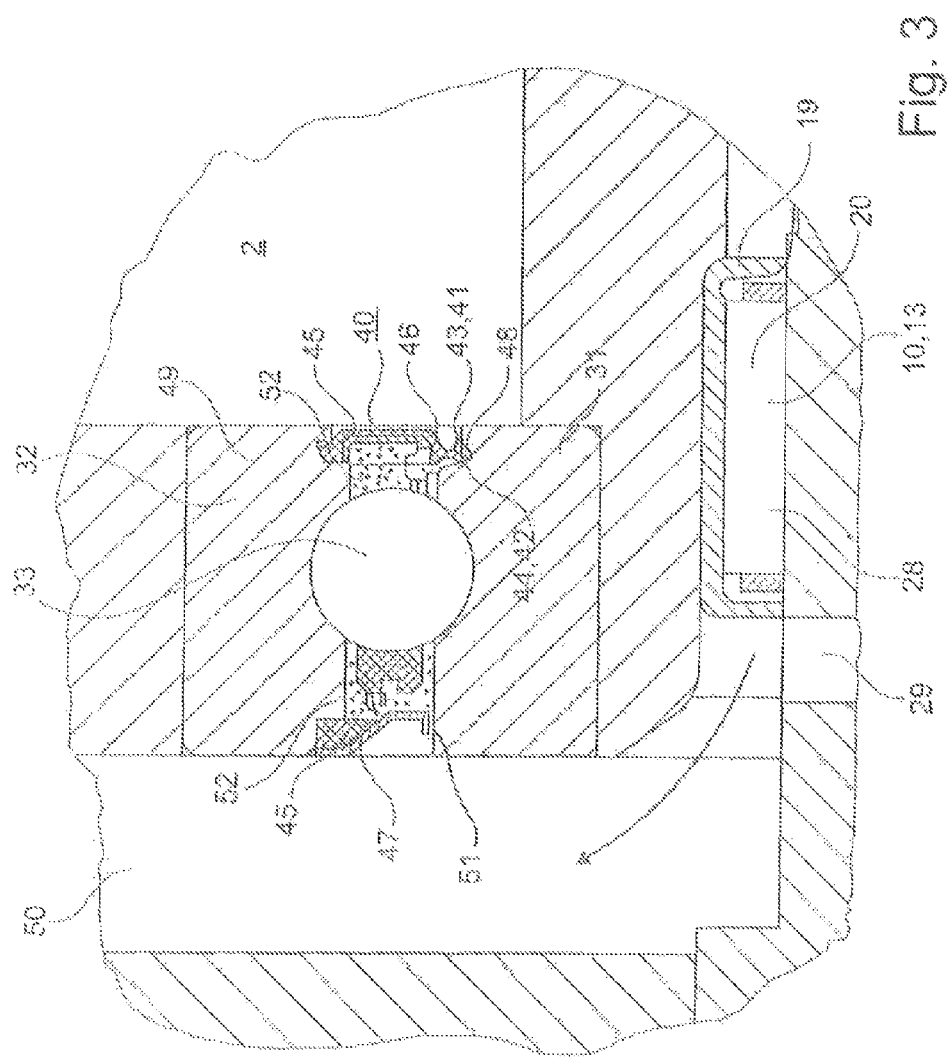
FIG. 3 shows the detail X from FIG. 1, with which the output-side rolling bearing for mounting the rotor shaft of the electric motor is represented in an enlarged form and not to scale.

FIGS. 1, 2 and 3—The angular-contact ball bearings 7 and 8 each have an inner race 31, an outer race 32 and balls 33. However, it is also conceivable that the raceways 34 and 36 of the angular-contact ball bearings 7 and 8 are formed directly on the rotor shaft 6 or the housing. The angular-contact ball bearings 7 and 8 are set in an X arrangement, that is to say that the pressure lines of both angular-contact ball bearings running through the centers intersect at P1 and P2 the axis of rotation 25 between the bearing points.

The angular-contact ball bearings 7 and 8 are respectively configured with a pressure angle $\alpha$ in the range of 15°-25°, preferably with 20°. The pressure angle $\alpha$ is the acute angle that the respective radial plane E and the respective contact line 38 running through the ball center point 37 form between them in the sectional plane of the longitudinal section represented.

FIG. 2, (FIG. 1)—The rolling bearing 39 is sealed off with a seal 40, which adjoins the balls 33 toward the electric motor 2. The seal 40 is formed by a reinforcement 45 and an elastic seal 46, is located in the outer race 32 and, as revealed by FIG. 2, an enlarged representation of the detail Z, lies with sealing lips in a sliding manner against sealing surfaces 43 and 44 at two sealing contacts 41 and 42 of a sealing groove 48 of the inner race 31.

The balls 33 are adjoined toward the transmission assembly by a sealing plate 47, which is fastened to the outer race 32. The rolling bearing 39 is open on the transmission side toward the transmission assembly by way of at least one radial first annular gap 51, which is formed between the sealing plate 47 and the inner race 31 and which accordingly establishes a gap seal.

FIG. 3, (FIG. 1)—The rolling bearing 49 is represented in FIG. 3 with an enlarged representation of the detail X and sealed off on one side toward the electric motor 2 likewise with a seal 40, which adjoins the balls 33 toward the electric motor 2. The seal 40 is formed by a reinforcement 45 and an elastic seal 46, is located in the outer race 32 and lies in a sliding manner against sealing surfaces 43 and 44 at two sealing contacts 41 and 42 of a seating groove 48 of the inner race 31. On the other side, toward an annular channel 50, the second rolling bearing 49 is accessible to lubricating oil by way of at least one radial annular gap 51, which is formed between the sealing plate 47 and the inner race 31 and accordingly forms a gap seal.

FIGS. 2, and 3—The annular gaps 51 of both rolling bearings 39 and 49 allow lubricating oil to pass through. Furthermore, both rolling bearings 39 and 49 are filled with lubricating grease 52.

FIG. 1—On the rotor shaft 6, a gear wheel 15 of the transmission assembly is fixed concentrically in relation to the axis of rotation 25 of the rotor shaft 6. The gear wheel 15 is supported by means of a hollow-cylindrical shank 16 in the rotor shaft 6, which is configured as a hollow shaft, and is the sun wheel 3, which is in interdental engagement with the only partially represented planet wheels 4 of the otherwise not represented planetary drive of the transmission assembly.

The rotor shaft 6 is hollow on the inside and has a through-hole 17. In the through-hole 17, the sun wheel 3 is fastened for rotation with said shaft. The shank 16 and the gear wheel 15 are hollow on the inside.

A further shaft 12 is fitted in the through-hole 17 of the rotor shaft 6 and a through-hole 18 of the sun wheel 3 and is rotatably mounted at two bearing points 10 and 11 in the rotor shaft 6. The bearing points 10 and 11 respectively have a rolling bearing formed as needle bearings 13 and 14. The needle bearings 13 and 14 are respectively formed by a sleeve 19 and needles 20.

Formed between the rotor shaft 6 and the further shaft 12 is an annular gap 21. A further annular gap 22 is formed between the sun wheel 3 and the further shaft 12. The cross section of the annular gap 22 is less than the cross section of the annular gap 21. The rotationally symmetrical shank 16 of the sun wheel 3 forms together with the surface of the shaft 12 a delivery device 23, which for the purpose of delivering lubricating oil is provided on the inside in the through-hole 18 with a helical profiling 24, which is facing the shaft 12 and runs around the latter. The direction of flow of the lubricating oil through the lubricating channels configured as annular gaps 21 and 22 is indicated by means of the directional arrows.

Figure 4:
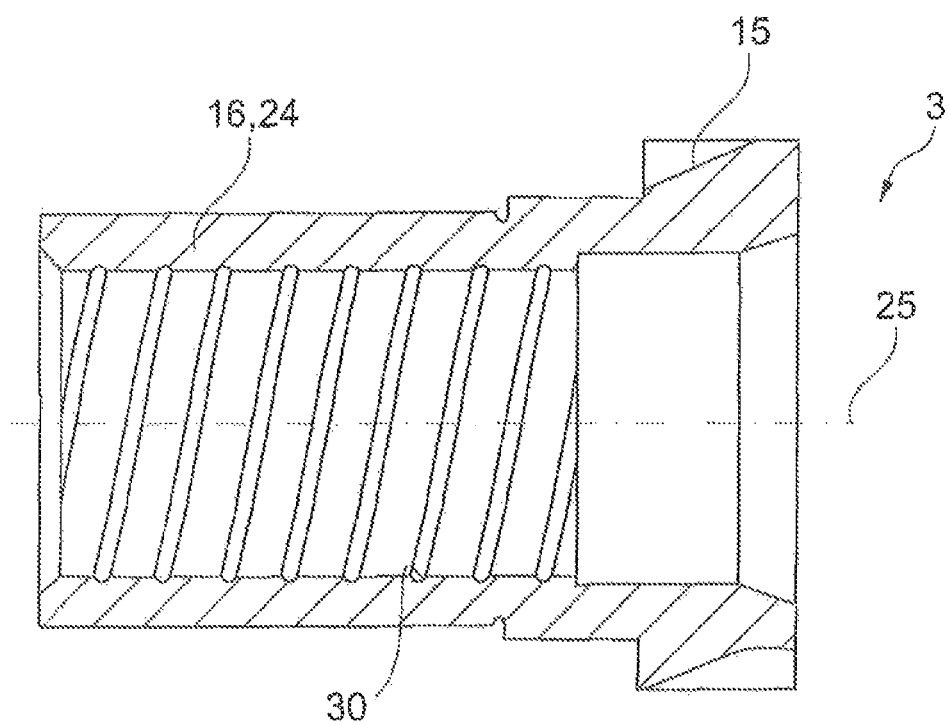
FIG. 4 shows the gear wheel of the planetary drive designed as a sun wheel, in a longitudinal section along the axis of rotation, represented in an enlarged form and not to scale.

FIG. 2 and FIG. 4—FIG. 4 shows a section through the sun wheel 3 along the axis of rotation. A helical profiling 24 on the inner side of the shank 16 is a spirally running groove 30, which delivers axially in the direction of the lubricating points 27 and 28 during rotation of the second shaft 12 when there is forward travel in one direction of rotation with, for example, high rotational speeds, also as a result of relative rotational speeds of the two shafts 6 and 12 with respect to each other.

FIGS. 1, 2 and 3—The delivery device 23 is consequently arranged with the helical profiling 24 rotatably about the common axis of rotation 25 of the shafts 6 and 12 in the annular gap 22 and is driven by means of the rotor shaft 6 during the operation of the electric motor 2. Alternatively, the delivery device 23, which is formed as one part with the gear wheel 15 and extends laterally from the latter, is driven by the planetary gear, and consequently by the gear wheel 15. Lubricating oil passes by way of the shaft end 26 into the annular gap 22, is delivered from there by the delivering effect of the helical profiling 24 into the annular gap 21 axially in relation to the lubricating points 27 and 28 and through these to the annular channel 50 before the rolling bearing 49. The lubricating oil is returned by way of the transverse bores 29 into the lubricating channel 35 and from there into the planetary gear.

| DESIGNATIONS | |
|---|---|
| 1 | Drive Unit |
| 2 | Electric Motor |
| 3 | Sun Wheel |
| 4 | Planet Wheel |
| 5 | Rotor |
| 6 | Rotor Shaft |
| 7 | Angular-Contact Ball Bearing |
| 8 | Angular-Contact Ball Bearing |
| 9 | Housing |
| 10 | Bearing Point |
| 11 | Bearing Point |
| 12 | Shaft |
| 13 | Needle Bearing |
| 14 | Needle Bearing |
| 15 | Gear Wheel |
| 16 | Shank |
| 17 | Through-Hole |
| 18 | Through-Hole |
| 19 | Sleeve |
| 20 | Needles |
| 21 | Annular Gap |
| 22 | Annular Gap |
| 23 | Delivery Device |
| 24 | Profiling |
| 25 | Axis of Rotation |
| 26 | Shaft End |
| 27 | Lubricating Point |
| 28 | Lubricating Point |
| 29 | Transverse Bore |
| 30 | Groove |
| 31 | Inner Race |
| 32 | Outer Race |
| 33 | Balls |
| 34 | Raceway |
| 35 | Lubricating Channel |
| 36 | Raceway |
| 37 | Ball Center Point |
| 38 | Contact line |
| 39 | Rolling Bearing |
| 40 | Seal |
| 41 | Sealing Contact |
| 42 | Sealing Contact |
| 43 | Sealing Surface |
| 44 | Sealing Surface |
| 45 | Reinforcement |
| 46 | Elastic Seal |
| 47 | Sealing Plate |

| | DESIGNATIONS |
|---|---|
| 48 | Sealing Groove |
| 49 | Rolling Bearing |
| 50 | Annular Channel |
| 51 | Annular Gap |

The invention claimed is:

1. A drive unit for motor vehicles, comprising;
at least one electric motor;
at least one transmission assembly;
at least one rotor shaft of the at least one electric motor operatively connecting the electric motor and the transmission assembly to one another; and
at least one first rolling bearing, which is located in a rotary lead-through for the rotor shaft in the transmission assembly with the rotor shaft being rotatably mounted by the at least one first rolling bearing,
wherein the first rolling bearing has a first seal, which is in slidingly sealing contact with a sealing surface at least one point, that seals the first rolling bearing on a side of the first rolling bearing facing the electric motor, and the first rolling bearing has at least one radial first annular gap such that the first rolling bearing is open on a side facing the transmission assembly,
wherein the first rolling bearing has rolling bodies arranged axially between the first seal and the radial first annular gap, and
wherein a part of the transmission assembly is driven by the rotor shaft, and a helical profiling between the part of the transmission assembly and a further shaft forms a delivery device for lubricating oil.

2. The drive unit as claimed in claim 1, wherein the radial first annular gap is formed at a gap seal comprising at least one sealing plate and a bearing race.

3. The drive unit as claimed in claim 1, further comprising a second rolling bearing for bearing the rotor shaft, which is arranged at a distance from the first rolling bearing, the second rolling bearing has a second seal, which is in slidingly sealing contact with a sealing surface at least one point, that seals the second roiling bearing on a side of the second rolling bearing facing the electric motor, and the second rolling bearing has at least one radial second annular gap such that the second rolling bearing is open on a side facing away from the electric motor, and the second roiling bearing has rolling bodies, which are arranged axially between the second seal and the radial second annular gap.

4. The drive unit as claimed in claim 3, wherein the second rolling bearing is at least partially filled with lubricating grease.

5. The drive unit as claimed in claim 3, wherein the second radial annular gap allows lubricating oil to pass through.

6. The drive unit as claimed in claim 3, wherein the second rolling bearing is at least partially filled with lubricating grease, and the second radial annular gap allows lubricating oil to pass through.

7. The drive unit as claimed in claim 3, wherein the second annular gap and the transmission assembly are connected to one another by at least one lubricating channel.

8. The drive unit as claimed in claim 7, wherein the rotor shaft of the electric motor is formed as a hollow shaft, wherein the further shaft is fitted in the hollow shaft, and wherein the lubricating channel is formed at least partially by a radial third annular gap located between the hollow shaft and the further shaft.

9. The drive unit as claimed in claim 8, wherein the at least one delivery device delivers lubricating oil to the third annular gap.

10. The drive unit as claimed in claim 9, wherein the helical profiling is a spirally running groove on the part of the transmission assembly.

11. The drive unit as claimed in claim 1, wherein the first rolling bearing is at least partially filled with lubricating grease.

12. The drive unit as claimed in claim 1, wherein the first radial annular gap allows lubricating oil to pass through.

13. The drive unit as claimed in claim 1, wherein the first rolling bearing is at least partially filled with lubricating grease, and the first radial annular gap allows lubricating oil to pass through.

14. The drive unit as claimed in claim 1, wherein the part of the transmission assembly is a gear wheel.

15. The drive unit as claimed in claim 14, wherein the part of the transmission assembly is a sun gear and a further part of the transmission assembly is a planet wheel.

16. The drive unit as claimed in claim 1, wherein the helical profiling is a spirally running groove on the part of the transmission assembly.

* * * * *